US008424603B2

(12) United States Patent
Loveless et al.

(10) Patent No.: US 8,424,603 B2
(45) Date of Patent: Apr. 23, 2013

(54) MULTIFUNCTIONAL BORONIC CROSSLINKERS AND ASSOCIATED METHODS

(75) Inventors: David M. Loveless, Duncan, OK (US); Rajesh K. Saini, Duncan, OK (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 435 days.

(21) Appl. No.: 12/827,224

(22) Filed: Jun. 30, 2010

(65) Prior Publication Data

US 2012/0000659 A1 Jan. 5, 2012

(51) Int. Cl.
| | |
|---|---|
| E21B 43/04 | (2006.01) |
| E21B 43/25 | (2006.01) |
| E21B 43/26 | (2006.01) |
| E21B 43/267 | (2006.01) |
| C09K 8/60 | (2006.01) |
| C09K 8/68 | (2006.01) |

(52) U.S. Cl.
USPC ..... 166/280.1; 166/278; 166/300; 166/305.1; 166/308.3; 166/308.5; 507/211; 507/219; 507/224; 507/225; 507/226; 507/228; 507/229; 507/273; 507/903

(58) Field of Classification Search ............... 507/273
See application file for complete search history.

(56) References Cited

U.S. PATENT DOCUMENTS

| | | | |
|---|---|---|---|
| 5,373,901 A | 12/1994 | Norman et al. | |
| 5,445,223 A * | 8/1995 | Nelson et al. | 166/308.5 |
| 5,559,082 A * | 9/1996 | Sanner et al. | 507/273 |
| 6,444,316 B1 | 9/2002 | Reddy et al. | |
| 6,488,091 B1 | 12/2002 | Weaver et al. | |
| 6,527,051 B1 | 3/2003 | Reddy et al. | |
| 6,554,071 B1 | 4/2003 | Reddy et al. | |
| 7,000,702 B2 | 2/2006 | Hanes, Jr. et al. | |
| 7,082,995 B2 | 8/2006 | Hanes, Jr. et al. | |
| 7,405,183 B2 * | 7/2008 | Hanes, Jr. | 507/261 |
| 8,173,580 B2 * | 5/2012 | De Benedictis et al. | 507/219 |
| 2005/0203256 A1 | 9/2005 | Destarac et al. | |
| 2006/0003900 A1 | 1/2006 | Hanes, Jr. | |
| 2006/0205605 A1 * | 9/2006 | Dessinges et al. | 507/211 |
| 2009/0181865 A1 * | 7/2009 | Dessinges et al. | 507/202 |
| 2010/0099586 A1 | 4/2010 | De Benedictis et al. | |
| 2010/0179076 A1 * | 7/2010 | Sullivan et al. | 507/214 |
| 2012/0004148 A1 | 1/2012 | Ogle et al. | |

FOREIGN PATENT DOCUMENTS

| | | |
|---|---|---|
| FR | 2855180 A1 | 11/2004 |
| WO | WO 2010/048091 A2 | 4/2010 |
| WO | 2012001363 A1 | 1/2012 |

OTHER PUBLICATIONS

International Search Report and Written Opinion for PCT/GB2011/000990 dated Oct. 7, 2011.
Li, Development of Boronic Acid Grafted Random Copolymer Sensing Fluid for Continuous Glucose Monitoring, Biomacromolecules, 2009.

(Continued)

Primary Examiner — George Suchfield
(74) Attorney, Agent, or Firm — Robert A. Kent; McDermott Will & Emery LLP (57) ABSTRACT

A method of treating a subterranean formation comprises providing a treatment fluid comprising: an aqueous fluid; a gelling agent, and a multifunctional boronic crosslinker comprising two or more boronic functional groups; and introducing the viscosified fluid into a subterranean formation.

14 Claims, 5 Drawing Sheets

OTHER PUBLICATIONS

Jakle, Borylated Polyolefins and Their Applications, Journal of Inorganic and Organometallic Polymers and Materials, 2005, 15, pp. 293-307.

Harris, Prediction of Proppant Transport from Rheological Data, SPE 115298, 2008.

Ivanov, et al., "Synthesis of Boronate-Containing Copolymers of N,N-dimethylacrylamide, their interaction with poly(vinyl alcohol) and rheological behaviour of the gels," Polymer, Elsevier Science Publishers B.V., GB, vol. 45, No. 8, Apr. 1, 2004, XP004497161.

International Search Report and Written Opinion for PCT/US2012/050231 dated Nov. 5, 2012.

Kitano, Shigeru, "Glucose-Responsive Complex Formation Between Poly(Vinyl Alcohol) and Poly(N-vinyl-2-pyrrolidone) with Pendent Phenylboronic Acid Moieties," Makromol. Chem., Rapid Commun. 12, 227-233 (1991).

Roberts et al., "Dynamically Restructuring Hydrogel Networks Formed with Reversible Covalent Crosslinks," Adv. Mater. 2007, 2503-2507.

Coveney et al., "Novel Approaches to Cross-Linking High Molecular Weight Polysaccharides: Application to Guar-Based Hydraulic Fracturing Fluids," Molecular Simulation, 2000, vol. 25, pp. 265-299.

Bishop et al., "Determination of the Mode and Efficacy of the Cross-Linking of Guar by Borate Using MAS 11B NMR of Borate Cross-Linked Guar in Combination with Solution 11B NMR of Model Systems," The Royal Society of Chemistry, 2004.

* cited by examiner

MULTIFUNCTIONAL BORONIC CROSSLINKERS AND ASSOCIATED METHODS

BACKGROUND

The present invention relates to methods and compositions for increasing the viscosity of a fluid. More particularly, the present invention relates to multifunctional boronic crosslinkers, viscosified treatment fluids, and methods of using these compositions in applications wherein viscosified fluids may be used.

Many industrial applications require viscosified fluids or "viscosified treatment fluids." As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. For instance, the upstream energy industry uses viscosified treatment fluids in a variety of production and stimulation operations. For example, such fluids may be used as drilling fluids, fracturing fluids, and gravel packing fluids. Generally, the viscosified treatment fluids that are used in subterranean operations are aqueous-based fluids that comprise gelling agents. These gelling agents may comprise biopolymers or synthetic polymers. Common gelling agents include, e.g., galactomannan gums, cellulosic polymers, and polysaccharides.

Most viscosified treatment fluids include crosslinked gelling agent molecules to increase their viscosity. The crosslinking between gelling agent molecules occurs through the action of a crosslinker. These crosslinkers may comprise a metal ion, transition metal, or metalloid, collectively referred to herein as "metal(s)." Examples include boron, aluminum, antimony, zirconium, magnesium, or titanium. Generally, the metal of a crosslinker interacts with at least two gelling agent molecules to form a crosslink between them, thereby forming a crosslinked gelling agent.

Conventional metal crosslinkers are frequently used in viscosified treatment fluids, however, use of such crosslinkers is problematic because they may not achieve a viscoelastic gel below a critical concentration of gelling agent. In addition, commonly used viscosified treatment fluids may not be thermally stable at temperatures exceeding about 200° F. such that the highly viscous gelled and crosslinked fluids lose viscosity with time at high temperatures. To offset this loss of viscosity, the concentration of the gelling agent and/or crosslinker may be increased; however, this leads to increased cost and may also make the viscosified treatment fluid more difficult to remove from the formation. It would be useful to have a crosslinked gelling agent that can be crosslinked using a reduced concentration of a gelling agent and a crosslinker. It is also desirable to crosslink the fluid at or near a neutral pH because of various problems. For instance, in some cases in which the fluid is crosslinked at a pH of 11 and above, calcium and magnesium ions may precipitate out of solution causing potential damage to the formation.

SUMMARY

The present invention relates to methods and compositions for increasing the viscosity of a fluid. More particularly, the present invention relates to multifunctional boronic crosslinkers, viscosified treatment fluids, and methods of using these compositions in applications wherein viscosified fluids may be used.

An embodiment of the present invention comprises a method of treating a subterranean formation, comprising: providing a treatment fluid comprising: an aqueous fluid; a gelling agent; and a multifunctional boronic crosslinker comprising two or more boronic functional groups; and introducing the viscosified fluid into a subterranean formation.

Another embodiment of the present invention comprises a method of treating a subterranean formation, comprising: providing a treatment fluid comprising: an aqueous fluid; a gelling agent; and a multifunctional boronic crosslinker comprising two or more boronic functional groups; introducing the treatment fluid into a subterranean formation at a pressure sufficient to create or enhance at least one fracture within the subterranean formation.

Still another embodiment of the present invention comprises a composition comprising: an aqueous fluid; a gelling agent; and a multifunctional boronic crosslinker comprising two or more boronic functional groups.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The present invention relates to methods and compositions for increasing the viscosity of a fluid. More particularly, the present invention relates to multifunctional boronic crosslinkers, viscosified treatment fluids, and methods of using these compositions in applications wherein viscosified fluids may be used.

The methods and compositions of the present invention are useful in a variety of applications in which it is desirable to increase the viscosity of a fluid. Examples include, but are not limited to, treatment fluids used in subterranean applications, such as drilling fluids, fracturing fluids, gravel packing fluids and viscous sweeps. Although many of the embodiments of the present invention will be discussed in the context of subterranean applications, such discussion is only intended to illustrate some applications of the multifunctional boronic crosslinkers of the present invention.

Embodiments of the present invention relate to viscosified treatment fluids comprising a multifunctional boronic crosslinker. There may be several potential advantages to the methods and compositions of the present invention, only some of which may be alluded to herein. The viscosified treatment fluids comprising a multifunctional boronic crosslinker may exhibit improved gelling characteristics despite a lower concentration of the multifunctional boronic crosslinker, and the viscosified treatment fluids may be broken lowering the pH of the fluid and then re-viscosified increasing the pH back to a level of at least slightly basic (that is, above about 7.5). By way of example, depending on the amount of gelling agent, amount of crosslinker, and the presence of crosslinkers in addition to the multifunctional boronic crosslinker, the fluid may crosslink at a pH of above about 7.5, above about 8, above about 8.5, above about 9, above about 9.5, above about 10, or above about 10.5. As another advantage, the multifunctional boronic crosslinker can be used to form a viscosified treatment fluid below the critical overlap concentration of the gelling agents in the treatment fluid. In addition, the viscosified treatment fluids of the present invention may exhibit viscoelastic behavior when crosslinked using the multifunctional boronic crosslinkers of the present invention. In some particular embodiments the multifunctional boronic crosslinker is capable of crosslinking the fluid at or close to a neutral pH. Additionally, the multifunctional boronic crosslinkers of the present invention may be thermally stable at temperatures above about 200° F. and in certain embodiments, the multifunctional boronic crosslinker may be suitable at temperatures ranging from about 75° F. to about 275° F.

In general, the viscosified treatment fluids of the present invention comprise an aqueous fluid, a multifunctional boronic crosslinker, and a gelling agent. The aqueous fluid of the viscosified treatment fluids of the present invention may comprise fresh water, saltwater (e.g., water containing one or more salts dissolved therein), brine (e.g., saturated salt water), seawater, a weighted brine (e.g., calcium bromide, sodium bromide), or any combination thereof. The aqueous fluid can be from any source. In general, the aqueous fluid should not contain an excess of compounds that can adversely affect the desired properties of the treatment fluid.

The present invention provides multifunctional boronic crosslinkers capable of crosslinking two or more molecules, e.g., two or more gelling agent molecules. The term "crosslink(s)" or "crosslinking" refers to a connecting unit between neighboring chains of atoms in a complex chemical molecule, e.g., a polymer. In some embodiments, the multifunctional boronic crosslinkers of the present invention comprise a polymeric backbone with a boronic functional group attached at one or more points along the polymer chain. Boronic functional groups suitable for use in the multifunctional boronic crosslinkers of the present invention may comprise any boronic functional group including, but not limited to, a boronic acid group (e.g., $B(OH)_2$). In some embodiments, the multifunctional boronic crosslinker can be di-, tri- or multifunctional in nature. In some embodiments, the multifunctional boronic crosslinker can be star shaped or dendrimeric in nature. The multifunctional boronic crosslinker may also be polymeric in nature. In some embodiments, a polymeric multifunctional boronic crosslinker can be a block copolymer including, but not limited to, a diblock, triblock or multibloc copolymer. A polymeric multifunctional boronic crosslinker can also be a co-polymer of various monomers and can also be in the form of comb or brush shaped polymer. In some embodiments, the multifunctional boronic crosslinker of the present invention is water soluble. As used herein, "water soluble" refers to at least about 0.01% by weight soluble in water at room temperature (about 72° F.).

In some embodiments, the multifunctional boronic crosslinker can be star shaped or dendrimeric in nature. An exemplary structure of a dendrimeric multifunctional boronic crosslinker is shown in Formula I.

Formula I

As used herein, the terms "dendritic polymers" or "dendrimers" generally comprise polymers which are distinguished by a branched structure and a high functionality. Dendrimers (e.g., cascade polymers, arborols, isotropically branched polymers, isobranched polymers, starburst polymers) generally are macromolecules which are uniform at the molecular level and have a highly symmetrical structure. Dendrimers are derived structurally from the star polymers, the individual chains in turn each being branched in a star-like manner. They form from small molecules by a constantly repeating reaction sequence, resulting in one or more branches, on the ends of which there are in each case functional groups which in turn are starting points for further branching. Thus, the number of functional terminal groups multiplies with each reaction step, a spherical prestructure forming at the end. A characteristic feature of the dendrimers is the number of reaction steps (generation) carried out for their synthesis. Owing to their uniform structure, dendrimers have as a rule a defined molar mass. In some embodiments, the multifunctional boronic crosslinkers of the present invention can be dendrimeric in nature with about 2 to about 10 generations. In another embodiment, the dendrimeric multifunctional boronic crosslinkers can have about 2 to about 5 generations. In some embodiments, the dendrimeric multifunctional boronic crosslinkers may generally have a molecular weight between about 1,000 Daltons and 10,000 Daltons.

In some embodiments, a dendritic polymer can be prepared using known techniques. One synthesis technique starts with $AB_2$ monomers, or $ABC_2$ monomers from a chain-growth polymerization process involving the copolymerization of an AB monomer with a C monomer. The "2" subscript denotes dual functionality of the monomers. In an $ABC_2$ the C monomer has dual functionality. The AB group is a polymerizable monomer that is able to react with an active moiety such as an anion, a cation, a radical or a conventional initiating or propagating moiety of the type well known for polymerization. The C monomer contains a polymerizable group that can be initiated by $A^*$, $B^*$ or by another suitable initiator including Lewis acids, bases, heat, light and radiation. Once the reaction of C with an A* or B* unit or other initiator has occurred, C becomes a new activated C* group capable of further reaction with any A-containing moiety present in the system, and also with any C monomer remaining in the system. The reactive moiety of the C monomer may be exactly the same as the AB monomer, or it may be another type of monomer having a reactivity or polymerizability similar to that of A with respect to B* or to A*. The process can be initiated and allowed to produce a polymer comprising a desired number of generations.

Star polymers are polymers in which three or more chains extend from a center. This center may be a single atom or a group of atoms. Star polymers are produced either by polymerization from multifunctional cores or by post modification reactions. Polymerization from a multifunctional core may be desirable for high molecular weight polymers. Star polymer synthesis by post modification reactions is well known, and described for example in B. Charleus and J. Nicolas, POLYMER 48: 5813 (2007); and in S. Abraham et al., *J Poly Sci A: Poly Chem* 45:5559 (2007).

The dendritic or star polymeric multifunctional boronic crosslinkers can comprise any suitable monomers and/or spacer units (e.g., "R" or "spacer" in Formula I) that result in a water soluble molecule in addition to one or more boronic functional groups. For example, Formula I illustrates a dendritic multifunctional boronic crosslinker with at least one generation that may have up to four boronic functional groups (e.g., boronic acid in Formula I). In some embodiments with at least 2 generations, the dendritic multifunctional boronic crosslinker may have up to eight boronic functional groups in the outer generation. In addition to the boronic functional group, spacer units may comprise a polymer or oligomer synthesized from a monomer that includes, but is not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, alkyl dimethylammoniumpropyl methacrylamide halides, any derivative thereof, or any combination thereof. Suitable spacer units may also comprise any suitable linkage moieties, including but not limited to, an amide, ester, ether, phosphate esters, amides, acetals, ketals, orthoesters, carbonates, anhydrides, silyl ethers, alkene oxides, ethers, imines, ether esters, ester amides, ester urethanes, carbonate urethanes, and amino acids linkage and derivatives or combinations thereof. Suitable spacer units may also comprise any suitable linkage moieties, including but not limited to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, poly(alkene oxides), polyethers, polyimines, poly(ether esters), poly(ester amides), poly(ester urethanes), poly(carbonate urethanes), and poly(amino acids), and derivatives or combinations thereof. In addition to these monomers and/or spacer units, one or more hydrophobic and/or hydrophilic monomers or polymers comprising hydrophobic monomers may be present in the interior generations of the dendrimer so long as any hydrophobic monomers do not interfere with the water solubility of the molecule. In some embodiments, the multifunctional boronic crosslinkers may have a ratio of boronic functional groups to monomers one the outer generation ranging from about 1:1 to about 1:200.

In some embodiments, the multifunctional boronic crosslinker can be a difunctionalized molecule. A suitable difunctionalized structure may include, but is not limited to, the structure generally represented by Formula II.

Formula II

In Formula II, $R_1$ and/or the spacer(s), alone or in combination, can be a functional group, a monomer, and/or a polymer with an average molecular weight in the range of about 200 Daltons to about 2,000,000 Daltons. The spacer(s) can be a small oligomer, a functional group, or a polymer suitable for connecting the monomer or polymer $R_1$ to the boronic functional group. Suitable spacer units may comprise any suitable moieties, including but not limited to, an amide group, an ester group, or an ether group. Suitable polymers useful as spacer units may comprise polyalphaolefins, polyaryletherketones, polybutenes, polyimines, polycarbonates, polyesters, aromatic polyamides, ethylene vinyl acetate, polyacetals, polyethylenes, polyethylene oxides, polypropylenes, polymethylpentene, polyphenylene oxide, polystyrene, derivatives thereof, or any combinations. In some embodiments, the multifunctional boronic crosslinker of the general structure shown in Formula II is water soluble polymer and can comprise any number of suitable monomer units that do not interfere with the crosslinking of the boronic group with the gelling agent.

The multifunctional boronic crosslinker can also be a copolymer. In some embodiments, the multifunctional boronic crosslinker can be a co-polymer of various monomers and can also be in the form of a comb shaped polymer or a brush shaped polymer. A suitable copolymer structure may include, but is not limited to, the structure generally represented by Formula III.

Formula III

In some embodiments, the polymeric multifunctional boronic crosslinker can be a block copolymer including, but not limited to, a diblock, triblock or multibloc copolymer. An exemplary embodiment of a suitable diblock copolymer structure may include, but is not limited to, the structure generally represented by Formula IV.

Formula IV

The copolymers and block copolymers of Formulas III and IV may have an average molecular weight in the range of about 1,000 Daltons to about 2,000,000 Daltons. For a multifunctional boronic crosslinker of the general structures shown in Formulas III or IV, the monomers within the polymer structure can be any suitable monomers that results in a water soluble molecule and do not interfere with the crosslinking of the boronic group with the gelling agent. Formulas III and IV illustrate that a boronic functional group may be directly bonded to the backbone of the polymer and/or the boronic functional group may be connected to the backbone of the polymer with an intervening spacer group between the boronic functional group and the backbone of the polymer.

In some embodiments, a multifunctional boronic crosslinker of the general structure shown in Formula III, may be synthesized by polymerization of a vinyl monomer containing a boronic functional group (e.g., 3-acrylamidophenyl boronic acid) capable of polymerization with any suitable monomer, functional group, including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, and alkyl dimethylammoniumpropyl methacrylamide halides. Other functional groups may also be present along the polymeric backbone. The multifunctional boronic crosslinker may also be synthesized by adding the boronic functional group to an existing water soluble polymer by known chemistries. In some embodiments, the boronic functional group can be grafted onto an already formed polymer backbone. In some embodiments as generally represented by Formulas III and IV, the ratio of the boronic functional group to the other monomer units in the polymer may range from about 1:1 to about 1:200.

In some embodiments, the multifunctional boronic crosslinkers of the present invention may comprise an equilibrium species. For example, the multifunctional boronic crosslinkers may become protonated or deprotonated depending on pH. Likewise, intramolecular interactions between atoms in the multifunctional boronic crosslinkers of the present invention and the geometry of boron (e.g., tetrahedral or trigonal planar) may depend on pH and/or solvent (e.g., an alcohol-based solvent such as methanol). Thus, the exact chemical composition and geometry of the multifunctional boronic crosslinkers of the present invention may depend on a particular equilibrium known to one of ordinary skill in the art. The geometry may also depend on the neighboring group participation in changing the steoreochemistry. For example, a nitrogen atom present in a neighboring group may share its lone pair of electron with a boron to result in a tetrahedral geometry, which may allow for the formation of a bond to hydroxyl groups at a relatively neutral pH.

Formula V illustrates an exemplary embodiment of the present invention.

Exemplary Formula V

In some embodiments, a multifunctional boronic crosslinker can be prepared by incorporation of one or more of the monomers listed above in the polymer synthesis with a boronic acid monomer. For example, a multifunctional boronic crosslinker according to exemplary Formula V can be prepared by copolymerizing 2-acrylamidophenylboronic acid with N,N-dimethylacrylamide in the ratio of about 1:1 to about 1:200 (e.g., a ratio of x:y ranging from about 1:1 to about 1:200 in exemplary Formula V) by free radical polymerization to provide the multifunctional boronic crosslinker. The boronic acid group can also be attached to a preexisting water soluble polymer by known chemistry.

In another exemplary embodiment, the multifunctional boronic crosslinker may comprise a compound represented by Formula VI:

Exemplary Formula VI

In this embodiment, R can be hydrogen or a methyl group, y can vary from 1 to about 200, and x can vary such that the ratio of the x:y ranges from about 1:1 to about 1:200. In an exemplary embodiment, a multifunctional boronic crosslinker according to exemplary Formula VI can be prepared by copolymerizing 2-((2-acrylamidoethylamino)methyl)phenylboronic acid with N,N-dimethylacrylamide in the ratio of about 1:1 to about 1:200 (e.g., a ratio of x:y ranging from about 1:1 to about 1:200 in exemplary Formula VI) by free radical polymerization to provide the multifunctional boronic crosslinker.

In still another exemplary embodiment, the multifunctional boronic crosslinker may be a difunctional boronic crosslinker and may comprise a compound represented by exemplary Formula VII. The diboronic acid crosslinker of exemplary Formula VII may be prepared by reacting two mole equivalent of o-boronic aldehyde with one mole equivalent of olegomeric ethyleneoxide diamine or olegomeric ethylenediamine followed by reduction.

Exemplary Formula VII

R = O, N
n = 1-1000

One of ordinary skill in the art, with the benefit of this disclosure, may synthesize the multifunctional boronic crosslinkers of the present invention using known materials and the relevant methods of preparative organic chemistry. For example, the multifunctional boronic crosslinkers of the present invention may be synthesized using reductive amination (see generally S. L. Wiskur, et al., *Org. Lett.*, 3(9):1311-14 (2001); A. E. Ivanov, et al., POLYMER, 45:2495-2505 (2004)).

The multifunctional boronic crosslinkers of the present invention may be provided or used in any suitable form. For instance, the multifunctional boronic crosslinkers may be a liquid, a gel, an emulsion, or a solid. The form of the multifunctional boronic crosslinkers may depend on the specific choice of the multifunctional boronic crosslinker (e.g., a structure corresponding to Formula I, II, III or IV). For example, in certain embodiments, a multifunctional boronic crosslinker may be added in a quantity beyond the solubility limit in an aqueous fluid and thus, not be in an aqueous form. In other embodiments, a multifunctional boronic crosslinker may be dissolved, suspended, or emulsified in a liquid.

In other embodiments, a multifunctional boronic crosslinker may be used in a form that allows for a delayed release of the multifunctional boronic crosslinker. A delayed release may be desirable when a subterranean operation involves high temperature conditions, and release of the multifunctional boronic crosslinker is desired after these high temperature conditions occur. For example, in wells with temperatures that require a second crosslinker, the second crosslinker may be tailored to become available for crosslinking when a first crosslinker fails, e.g., at temperatures in which a conventional boron based crosslinker fails. A delayed release also may be desirable in a deep well or in a well requiring a long pump time. In certain embodiments, the multifunctional boronic crosslinkers of the present invention may be encapsulated or enclosed within an outer coating that is capable of degrading at a desired time. Exemplary encapsulation methodologies are described in U.S. Pat. Nos. 5,373,901; 6,444,316; 6,527,051; and 6,554,071, the entire disclosures of which are incorporated herein by reference. The crosslinking of the fluid may also be delayed by preparing the fluid at low pH and adding an encapsulated pH adjusting agent that can raise the pH of the treatment fluid for crosslinking. A person having ordinary skill in the art, with the benefit of this disclosure, will recognize the appropriate encapsulation or coating technique to use with the multifunctional boronic crosslinkers of the present invention.

In certain embodiments in which the multifunctional boronic crosslinkers of the present invention are encapsulated, the multifunctional boronic crosslinkers may comprise a coating or containment means, e.g., to delay the release of a multifunctional boronic crosslinker. In general, suitable coating or containment means are degradable materials in which the products of the degradation do not adversely affect the multifunctional boronic crosslinkers of the present invention. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or containment means in conjunction with the multifunctional boronic crosslinkers of the present invention include, but are not limited to, polysaccharides, such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; ortho esters; poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, polyethylene oxide, polyvinyl alcohol, alginate, polycaprolactone, gelatinised starch-based materials, and the like). In certain exemplary embodiments, blends of these materials may be used.

The multifunctional boronic crosslinkers of the present invention may be used to form a crosslinked gelling agent. Under appropriate conditions (e.g., pH and temperature), the multifunctional boronic crosslinkers of the present invention may allow one or more crosslinks to form between at least two gelling agent molecules. In addition, in some embodiments, viscosified treatment fluids comprising a multifunctional boronic crosslinker may exhibit viscoelastic behavior and may be broken using a pH shift to a less basic environment and reversibly formed by changing the pH back to a more basic environment.

The multifunctional boronic crosslinkers of the present invention may be used to crosslink gelling agent molecules to form a viscosified treatment fluid. The multifunctional boronic crosslinkers of the present invention generally are present in an amount sufficient to provide the desired degree of crosslinking between gelling agent molecules, or to generate the desired viscosity or viscoelastic properties for a particular treatment. In certain embodiments, the multifunctional boronic crosslinkers are present in the treatment fluid in an amount in the range of from about 0.003% to about 1% by weight of the aqueous fluid therein. In some embodiments, the multifunctional boronic crosslinker may be added in an amount ranging from about 0.05 pounds per 1,000 gallons of treatment fluid ("lb/Mgal") to about 85 lb/Mgal. In another embodiment, the multifunctional boronic crosslinker may be added to the treatment fluid in an amount ranging from about 1.0 lb/Mgal to about 50 lb/Mgal. The amount of multifunctional boronic crosslinker added to the treatment fluid may depend on the gelling agents used, the structure of the multifunctional boronic crosslinker, the average molecular weight of the multifunctional boronic crosslinker, the number of boronic functional groups within the multifunctional boronic crosslinker, and the critical overlap concentration of the gelling agent or agents used in the treatment fluid, as described in more detail below.

The multifunctional boronic crosslinkers, in some embodiments, may allow for the formation of a viscosified treatment fluid with a treatment fluid comprising a gelling agent at a concentration below the critical overlap concentration. The critical overlap concentration (C*) of the gelling agent or agents used to form the viscosified treatment fluid may be described as that concentration necessary to cause polymer chain overlap, that is, the concentration above which the viscosity of a fluid containing the gelling agent is influenced not just by the weight percent of the individual gelling agent molecule strands, but also by the interaction of the individual strands with one another. The value of C* can be used to denote the minimum concentration of gelling agent needed for effective crosslinking with a traditional crosslinker. C* is a concentration value expressed in "true percent" that denotes the concentration of gelling agent needed for optimum viscosity formation. The value of C* may be determined by measuring the viscosity of several concentrations of the gelling agent in an aqueous solution. While C* is related to molecular weight, it is only directly related within the same polymer in the same solution environment having different molecular weights. By way of example, a guar polymer having a molecular weight of 2,000,000 will likely have a different C* than a derivatized guar polymer having the same molecular weight. Moreover, changing the environment can effect that C* of a polymer, for example, a guar polymer having a molecular weight of 2,000,000 will exhibit one C* in fresh water, but a different C* when methanol or a salt is added to the water. One skilled in the art will recognize the effect that additives such as methanol and salt can have on C* based on the expanding and contracting effect they have on the polymer itself in the water. Without intending to be limited by theory, it is believed that the presence of certain multiple boronic functional groups may allow for a multifunctional boronic crosslinker molecular to span between polymer chains to allow the formation of a crosslinked treatment fluid when the treatment fluid comprises a gelling agent below its C* value. Such interactions may depend on the structure of the multifunctional boronic crosslinker, the number of boronic functional groups included in the multifunctional boronic crosslinker, and the average molecular weight of the multifunctional boronic crosslinker. For example, the interactions are more likely to occur with a polymeric multifunctional boronic crosslinker than a lower molecular weight star shaped or bi-functional multifunctional boronic crosslinker.

A variety of gelling agents can be used in the viscosified treatment fluids of the present invention. Suitable gelling agents typically comprise biopolymers, synthetic polymers, or both. In certain embodiments, suitable gelling agents may comprise a plurality of hydroxyl functional groups oriented to allow binding to a boronic functional group (e.g., cis orientation, trans orientation, or the orientation of two hydroxyl groups on nearby molecules aligned to allow for the binding of a boronic functional group). Without wishing to be limited by any particular theory, it is believed that in certain embodiments, a boronic functional group present in a multifunctional boronic crosslinker of the present invention may form a crosslink with the hydroxyl groups on a gelling agent molecule to form a viscosified treatment fluid. In some embodiments, the viscosified treatment fluid may exhibit viscoelastic properties. In certain embodiments, suitable gelling agents may be biopolymers comprising polysaccharides, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, cellulose derivatives, such as hydroxyethyl cellulose, and xanthan and derivatives thereof. In some embodiments, the gelling agent (e.g., a biopolymer) may be depolymerized. The term "depolymerized," as used herein, generally refers to a decrease in the molecular weight of the gelling agent molecule. Depolymerized gelling agent molecules are described in U.S. Pat. No. 6,488,091, the entire disclosure of which is incorporated herein by reference.

In some embodiments, the gelling agent may comprise a water soluble synthetic polymer. Synthetic polymers can be prepared by any suitable monomers known in the art, including those useful for forming the multifunctional boronic crosslinkers. In some embodiments, suitable monomers useful in forming a synthetic polymer useful as a gelling agent can include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, and alkyl dimethylammoniumpropyl methacrylamide halides. Examples of such synthetic polymers may include, but are not limited to, polyacrylate, polymethacrylate, polyacrylamide, polyvinyl alcohol, polyvinylpyrrolidone, and their copolymers.

In certain embodiments, a gelling agent is present in the treatment fluids of the present invention in an amount in the range of from about 0.1% to about 10% by weight of the aqueous fluid therein. In certain exemplary embodiments, the gelling agent is present in the treatment fluids of the present invention in an amount in the range of from about 0.2% to about 4% by weight of the aqueous fluid therein.

In some applications, after a viscosified treatment fluid has performed its desired function, its viscosity may be reduced. For example, in a subterranean application, once the viscosified treatment fluid's viscosity is reduced, it may be flowed back to the surface, and the well may be returned to production. Reducing the viscosity of a viscosified treatment fluid may occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules). Delinking also may occur, independent of pH, through the addition of a compound capable of removing and/or sequestering the metal associated with the crosslink. Such delinking is described in U.S. Pat. No. 7,000,702, the entire disclosure of which is incorporated herein by reference.

Although the crosslinked gelling agent molecules crosslinked with the multifunctional boronic crosslinkers of the present invention may be capable of delinking based on pH, any breaker may be used with the viscosified treatment fluids of the present invention. The term "breaker" refers to an agent that is capable of reducing the viscosity of a treatment fluid. For example, any breaker that is an acid, oxidizer, or enzyme known in the art may be used with the treatment fluids of the present invention. Suitable acid breakers can include mineral acids such as hydrochloric acid, sulfuric acid, or nitric acid. Suitable oxidizers can include, but are not limited to, persulfates, peroxides, and hypochlorites. In some embodiments, the breaker may be a delayed breaker such as a delayed release acid capable of lowering the pH of the treating fluid. Examples of delayed breakers which may be used include, but are not limited to, various lactones, esters, encapsulated acids and slowly soluble acid generating compounds, oxidizers which produce acids upon reaction with water, water reactive metals such as aluminum, lithium and magnesium and the like. The breaker may be included in the treatment fluid in an amount in the range of from about 0% to about 1% by weight of the aqueous fluid therein. Enzyme breakers capable of generating acids may also be employed including alpha and beta amylases, amyloglucosidase, invertase, maltase, cellulase and hemi-cellulase. The specific delayed breaker used, whether or not it is encapsulated, as well as the amount thereof employed will depend upon the breaking time desired, the nature of the gelling agent and the multifunctional boronic crosslinker, formation characteristics and conditions and other factors.

The viscosified treatment fluids of the present invention also may comprise pH-adjusting agents. The pH-adjusting agents may be included in the viscosified treatment fluid to adjust the pH of the viscosified treatment fluid, inter alia, to facilitate the formation or delinking of crosslinks between gelling agent molecules. In some embodiments, multifunctional boronic crosslinkers may not be capable of forming crosslinks between gelling agent molecules in acidic environments at or below a pH ranging from about 6.0 to 7.0. Therefore crosslinking or delinking may occur by adjusting the pH of the viscosified treatment fluid once it is placed in a desired location, e.g., in a subterranean well bore. In certain embodiments in which the pH is to be increased (e.g., to facilitate crosslinking), suitable pH-adjusting agents comprise a base. Examples of suitable bases include, but are not limited to, sodium hydroxide, potassium hydroxide, lithium hydroxide, sodium carbonate, potassium carbonate, ammonium hydroxide or a combination thereof. In other embodiments in which the pH is to be decreased (e.g., to facilitate delinking crosslinks), suitable pH-adjusting agents include, but are not limited to, fumaric acid, formic acid, acetic acid, acetic anhydride, hydrochloric acid, hydrofluoric acid, hydroxyfluoroboric acid, polyaspartic acid, polysuccinimide, or a combination thereof. The appropriate pH-adjusting agent and amount thereof used may depend on the formation characteristics and conditions, on the breaking or crosslinking time desired, on the nature of the multifunctional boronic crosslinker used, and on other factors known to individuals skilled in the art with the benefit of this disclosure.

In some embodiments, the multifunctional boronic crosslinker may be crosslinked at a lower pH by inserting a electron withdrawing group in the multifunctional boronic crosslinker so that pKa of a boronic acid group can be lowered. In some embodiments, the multifunctional boronic crosslinker can comprise a monomer or functional group capable of changing the geometry of the boron functional group (e.g., boronic acid) from a planar configuration to a tetrahedral configuration to allow the treatment fluid to crosslink at a lower pH. In this embodiment, the treatment fluid may be crosslinked at a pH ranging from about 5 to about 8.

In addition, the viscosified treatment fluids of the present invention may further comprise a buffer. Buffers may be used to maintain a viscosified treatment fluid's pH in a limited range. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer may be included in an amount sufficient to maintain the pH of such viscosified treatment fluids at a desired level. In an embodiment, a buffer may be included in an amount of from about 0.5% to about 10% by weight of the aqueous fluid therein. One of ordinary skill in the art, with the benefit of this disclosure, will recognize the appropriate buffer and amount of the buffer to use for a chosen application.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, polytetrafluoroethylene materials (such as Teflon®, commercially available from DuPont), nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

Additional additives may be added to the viscosified treatment fluids of the present invention as deemed appropriate by one skilled in the art with the benefit of this disclosure. Examples of such additives include, but are not limited to, fluid loss control agents, surfactants, dispersing agents, weighting agents, scale inhibitors, clay stabilizers, silicate-control agents, antifoaming agents, foaming agents, biocides, biostatic agents, storage stabilizers, and combinations thereof.

The viscosified treatment fluids of the present invention can be used for carrying out a variety of subterranean well treatments, including, but not limited to, fracturing and gravel packing subterranean formations. In certain embodiments in which the viscosified treatment fluids of the present invention are used in conjunction with fracturing operations, fracturing fluids comprising an aqueous fluid, a gelling agent and a multifunctional boronic crosslinking agent of the present invention, may be placed in a subterranean formation so as to create or enhance one or more fractures therein. After the fracturing fluid has performed its desired function, or after a desired time, the viscosity of the fracturing fluid may be reduced and the fluid recovered.

In certain embodiments in which the viscosified treatment fluids of the present invention are used in conjunction with gravel packing operations, gravel packing fluids comprising an aqueous fluid, gravel, and a multifunctional boronic crosslinker of the present invention, may be placed in or near a portion of a subterranean formation so as to create a gravel pack. After the gravel pack is substantially in place, the viscosity of the gravel packing fluid may be reduced to a desired degree.

The present invention also provides methods of reusing viscosified treatment fluids or any component, or combination of components, therein. In general, the viscosified treatment fluids of the present invention can be reused because gelling agents crosslinked using the multifunctional boronic crosslinkers of the present invention can be delinked. In certain embodiments, reuse of the viscosified treatment fluids of the present invention involves delinking the crosslinked gelling agents to a sufficient degree so as to remove the crosslinks to at least one gelling agent molecule thereby forming a "delinked gelling agent." These delinked gelling agents may then be crosslinked, e.g., to increase the viscosity of the same or a different viscosified treatment fluid. In certain embodiments, one or more components of a viscosified treatment fluid comprising delinked gelling agents may be reused. For example, the gelling agent or the water of a viscosified treatment fluid may be reused. Reusing viscosified treatment fluids is described U.S. Pat. No. 7,082,995, the entire disclosure of which is incorporated herein by reference.

In some embodiments, a method of treating a subterranean formation comprises providing a treatment fluid comprising an aqueous fluid, a gelling agent, and a multifunctional boronic crosslinker comprising at least one boronic functional group; and introducing the viscosified fluid into a subterranean formation. In some embodiments, the treatment fluid may be contacted with a breaker, and the viscosity of the treatment fluid may be allowed to decrease. The treatment fluid may then be re-crosslinking to increase the viscosity of the treatment fluid as desired.

In another embodiment, the treatment fluid may be used for a fracturing operation. A method of fracturing a subterranean formation may comprise providing a treatment fluid comprising: an aqueous fluid; a gelling agent; and a multifunctional boronic crosslinker comprising at least two boronic functional group; introducing the treatment fluid into a subterranean formation at a pressure sufficient to create or enhance at least one fracture within the subterranean formation. In some embodiments, the treatment fluid may be contacted with a breaker, and the viscosity of the treatment fluid may be allowed to decrease. The treatment fluid may then be re-crosslinking to increase the viscosity of the treatment fluid as desired.

To facilitate a better understanding of the present invention, the following examples of certain aspects of some embodiments are given. In no way should the following examples be read to limit, or define, the scope of the invention.

EXAMPLE 1

Figure 1:
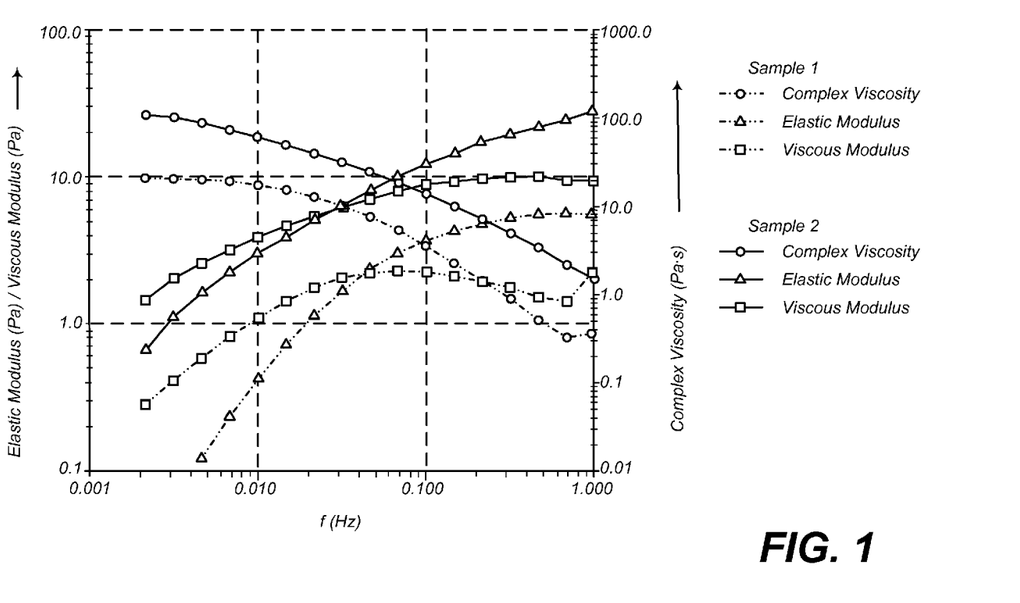
FIG. 1 illustrates the experimental results of a frequency sweep analysis of an embodiment of a viscosified fluid comprising a multifunctional boronic crosslinker.

In this example, the rheological properties of two crosslinked fluids are compared. A first sample labeled Sample 1 was prepared comprising 35 lb/Mgal (i.e., pounds per 1,000 gallons of base fluid) of WG-35™ gelling agent (a guar based gelling agent commercially available from available from Halliburton Energy Services, Inc., of Duncan, Okla.), and 1% by volume borate crosslinker BC-140™ (commercially available from Halliburton Energy Services, Inc., of Duncan, Okla.). These two components were mixed in de-ionized water to form a final concentration of boron in the gel of 400 μmol. The pH of the first sample was 8.5. The second sample called Sample 2 comprised 35 lb/Mgal of WG-35™ gelling agent hydrate in DI water and contained 0.0115 g of multifunctional boronic crosslinker of the present invention. The final concentration of boron in the gel was 2.5 μmol. The pH of the second sample was 8.42. The rheological properties of the two samples are shown in FIG. 1. In FIG. 1, several rheological parameters are shown including the Storage (Elastic) Modulus (G'), the Viscous (Loss) Modulus (G"), and the Complex Viscosity (f').

As shown in FIG. 1, it was observed that Sample 2 comprising the multifunctional boronic crosslinker demonstrated stiffer gel properties with a higher elastic modulus, viscous modulus, and viscosity than the corresponding elastic modulus, viscous modulus, and viscosity for Sample 1. The sample comprising the multifunctional boronic crosslinker achieved viscoelastic properties at higher efficiency and at a lower concentration of added crosslinker.

EXAMPLE 2

In this example, the viscoelastic properties of two crosslinked fluids are compared. A sample called Sample 3 was prepared comprising 35 lb/Mgal of WG-35™ gelling agent (commercially available from Halliburton Energy Services, Inc., of Duncan, Okla.) and 3% v/v of a borate crosslinker BC-140™ (commercially available from Halliburton Energy Services, Inc., of Duncan, Okla.). The balance of the sample comprises de-ionized water. Another sample called Sample 4 was prepared comprising 35 lb/Mgal of WG-35™ gelling agent, 1% v/v of BC-140 and 0.9% of a multifunctional boronic crosslinker of the present invention. The viscoelastic properties of the two samples are shown in FIG. 2.

Figure 2:
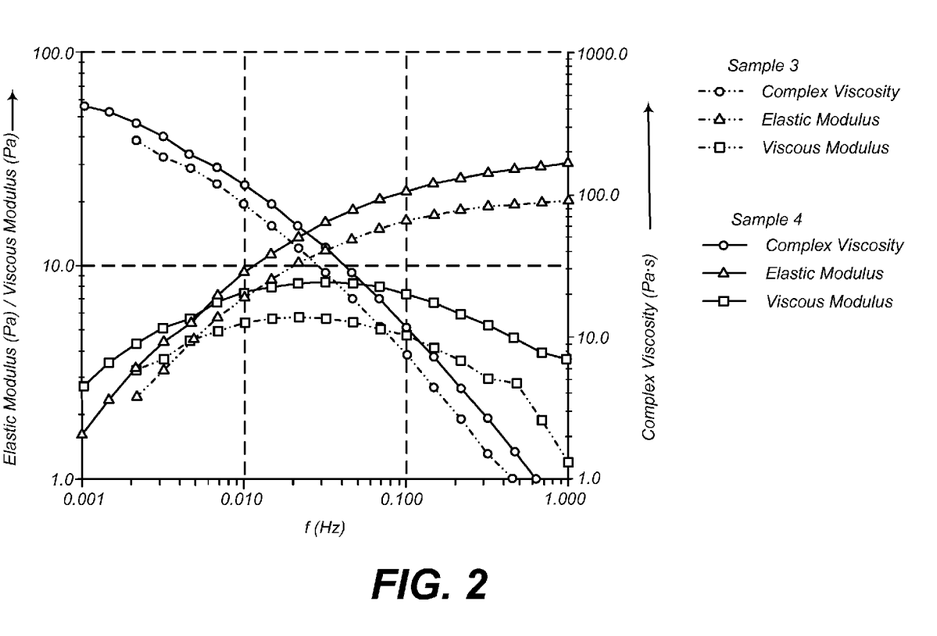
FIG. 2 illustrates the experimental results of a frequency sweep analysis of another embodiment of a viscosified fluid comprising a multifunctional boronic crosslinker.

As shown in FIG. 2, it was observed that Sample 4 comprising the multifunctional boronic crosslinker demonstrated improved viscoelastic properties including a higher elastic modulus, viscous modulus, and viscosity than the corresponding elastic modulus, viscous modulus, and viscosity for Sample 3. The viscoelastic properties of the gel were enhanced beyond the level achievable using tradition borate crosslinkers.

EXAMPLE 3

Figure 3:
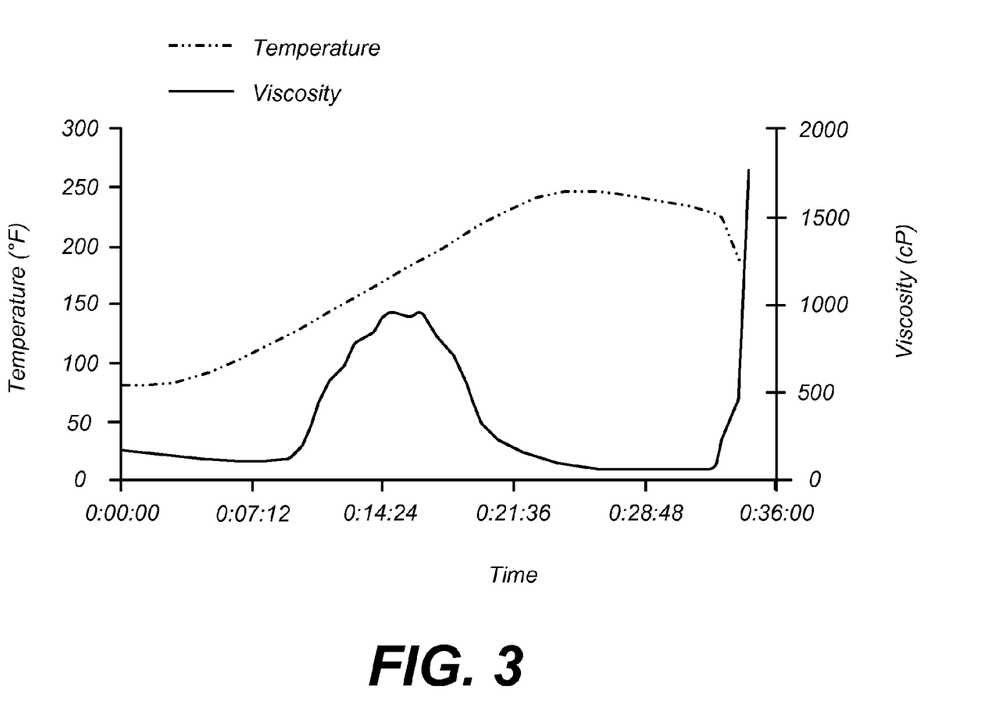
FIG. 3 illustrates the experimental results of a steady shear viscosity analysis of an embodiment of a viscosified fluid comprising a multifunctional boronic crosslinker.

The multifunctional boronic crosslinkers may also be used to improve the temperature stability of a viscosified fluid. In this example, a viscosified fluid labeled Sample 5 comprising 35 lb/Mgal of WG-35™ gelling agent (commercially available from Halliburton Energy Services, Inc., of Duncan, Okla.) and 0.053% w/w of a multifunctional boronic crosslinker was prepared at a pH of 9.2. Sample 5 demonstrated a relatively high viscosity at 40 s$^{-1}$ even at approximately 200° F. The results of the temperature and viscosity measurements are shown in FIG. 3. As shown in FIG. 3, it was observed that the sample comprising the multifunctional boronic crosslinker demonstrated temperature stability.

EXAMPLE 4

Figure 4:
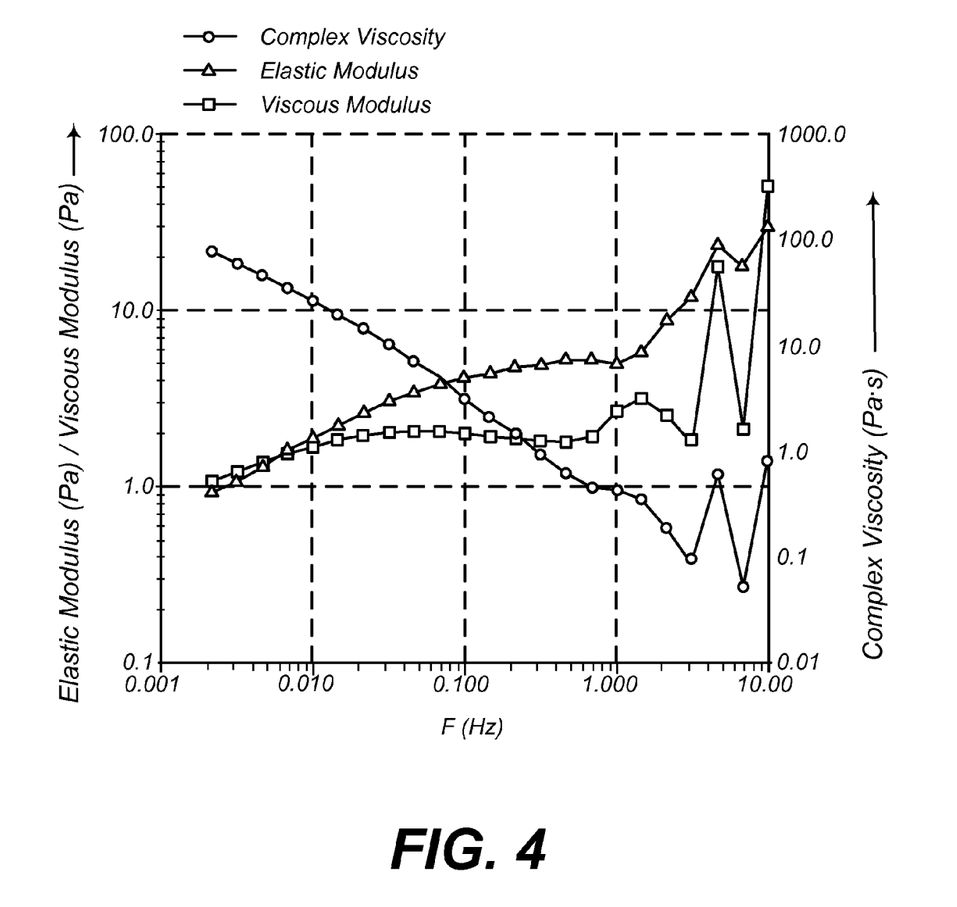
FIG. 4 illustrates the experimental results of a frequency sweep analysis of still another embodiment of a viscosified fluid comprising a multifunctional boronic crosslinker.

A sample labeled Sample 6 was prepared comprising 40 lb/Mgal of a gelling agent and crosslinked with 9.5 lb/Mgal of a multifunctional boronic crosslinker at a pH of 9.4. The frequency sweep response curves including the elastic modulus, viscous modulus, and viscosity are shown in FIG. 4. A traditional borate type crosslinker is not generally able to form a viscoelastic gel at this gelling agent concentration, which is below C* for this sample, regardless of the amount of crosslinker put into the formulation. This result demonstrates that using a multifunctional boronic crosslinker can advantageously form a viscoelastic gel below the C* for the fluid in some embodiments.

EXAMPLE 5

Figure 5:
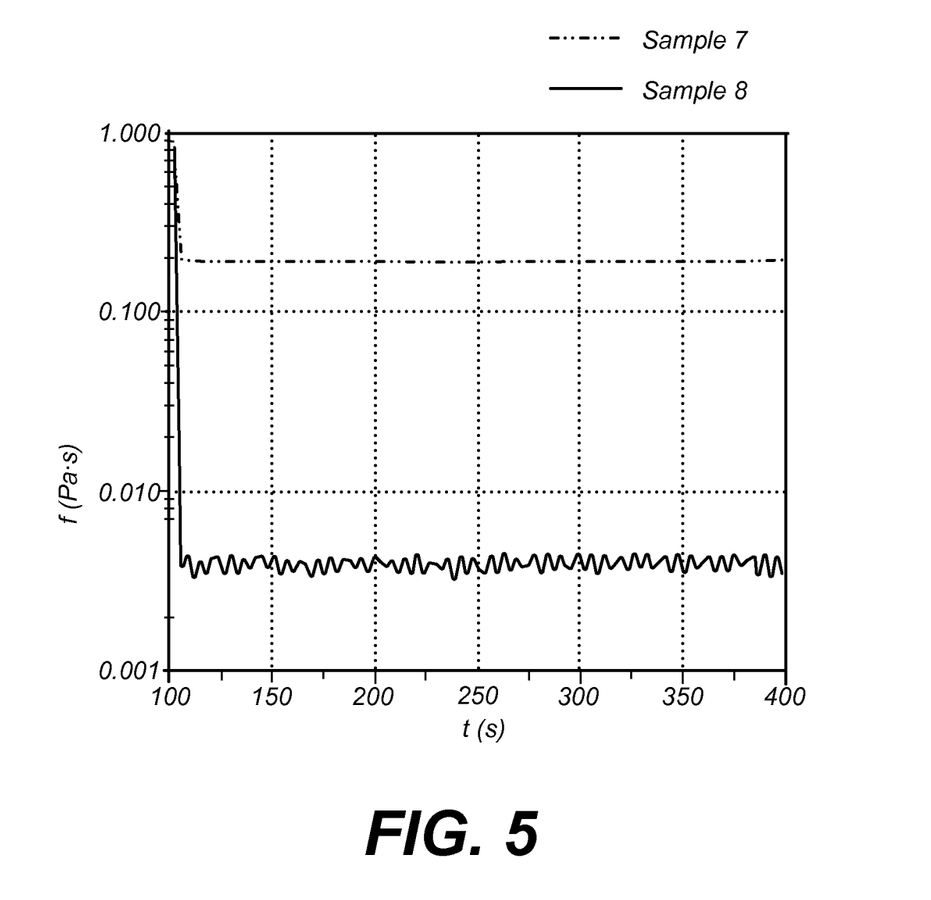
FIG. 5 illustrates the experimental results of a steady shear viscosity analysis of another embodiment of a viscosified fluid comprising a multifunctional boronic crosslinker.

Two gels samples with similar viscoelastic profiles were prepared. The first sample was labeled Sample 7 and comprised 35 lb/Mgal of WG-35™ (commercially available from Halliburton Energy Services, Inc., of Duncan, Okla.) crosslinked with 0.2% by weight of a multifunctional boronic crosslinker, while the second sample was labeled Sample 8 and comprised 35 lb/Mgal of HMP™ (a Halliburton MicroPolymer™ fluid commercially available from Halliburton Energy Services, Inc., of Duncan, Okla.) crosslinked with the same amount of the same crosslinker. The steady shear viscosity of the samples was measured on a Haake rheometer at 40 s$^{-1}$. The gels formed normal viscoelastic networks at a pH ranging from about 8-12. When the pH was lowered each gel dropped to a free flowing liquid. However, the steady shear viscosity for the viscosified fluid comprising HMP™ was significantly lower than the viscosified fluid comprising WG-35™, which may be expected as the HMP™ comprises smaller gel polymers. The results are shown in FIG. 5.

EXAMPLE 6

A copolymer of N,N-dimethyl acrylamide and 3-acrylamidophenyl boronic acid were synthesized according to the following protocol. N,N-Dimethylacrylamide (1.8 g) and 3-acrylamidophenyl-boronic acid (0.38 g) was dissolved in 18 ml of water. The solution was purged with argon for 15 minutes. Potassium persulfate (7 mg) was added to the solution along with N,N,N',N'-tetramethylethylamine (7 mg). The solution was kept in a water bath at 50° C. for 5 hours. The material polymerized into a thick gel that was diluted for subsequent use as a crosslinker.

EXAMPLE 7

Ethylenediamine (4.01 g, 66.7 mmol) and 2-formylphenyl-boronic acid (10 g, 66.7 mmol) were mixed in 1,2-dichloroethane (350 ml) and then treated with sodium triacetoxyborohydride (19.79 g, 93 mmol). The reaction is believed to proceed according to:

The mixture was stirred at room temperature under argon atmosphere for 2 hours until the reactants were consumed as determined by thin layer chromatography. The reaction mixture was quenched by adding aqueous saturated sodium bicarbonate, and product was extracted with ethylacetate. The ethylacetate extract was dried (MgSO$_4$) and the solvent was evaporated to give the crude free base comprising 2-((2-aminoethylamino)methyl)phenylboronic acid.

2-((2-aminoethylamino)methyl)phenylboronic acid (4.3 g, 22.16 mmol) was dissolved in 50 ml of 2M NaOH (3.54 g, 88.6 mmol) and cooled to 2° C. in an ice bath. Acryloyl chloride (4.01 g, 3.6 ml, 44.3 mmol) was added drop-wise to the solution under intense magnetic stirring for 10-15 min. The reaction is believed to proceed according to:

The solution was allowed to stir for additional 1 hour. Hydrochloric acid (2M) was added drop-wise to the reaction mixture in order to adjust its pH to about 1 and precipitate a white product. The white precipitate was separated by filtration on a Buckner funnel and washed with chilled water (100 ml). The collected precipitate was dried under vacuum to afford 4.6 g of the final product comprising 2-((2-acrylamidoethylamino)methyl)phenylboronic acid.

2-((2-acrylamidoethylamino)methyl)phenylboronic acid (0.338 g, 1.563 mmol) and acrylamide (1 g, 14.07 mmol) were dissolved in 12.4 ml of water. A small amount of 1N NaOH solution was added to dissolve the boronic acid. The solution was purged with argon for 15 minutes. 3.72 mg of sodium persulfate and 3.72 mg of TEED was added to this solution. The reaction is believed to proceed according to.

The solution was kept in 45° C. for 2 hours and formed a thick polymer solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and all combinations of such embodiments are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of treating a subterranean formation, comprising:
   providing a treatment fluid comprising:
   an aqueous fluid;
   a gelling agent; and
   a multifunctional boronic crosslinker comprising a dendritic polymer and two or more boronic functional groups, wherein the dendritic polymer comprises at least one monomer unit selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide alkyl dimethylammoniumethyl methacrylate halide, an alkyl dimethylammoniumpropyl methacrylamide halide, any derivative thereof, and any combination thereof; and
   introducing the viscosified fluid into a subterranean formation.

2. The method of claim 1 wherein the multifunctional boronic crosslinker comprises between about 2 and about 10 generations.

3. The method of claim 1 wherein the gelling agent is present below the critical overlap concentration.

4. The method of claim 1 wherein the multifunctional boronic crosslinker is encapsulated to delay the release of the multifunctional boronic crosslinker.

5. The method of claim 1 further comprising:
   contacting the treatment fluid with a breaker;
   allowing the viscosity of the fluid to decrease; and
   re-crosslinking the fluid to increase the viscosity of the treatment fluid.

6. A method of treating a subterranean formation, comprising:
   providing a treatment fluid comprising:
   an aqueous fluid;
   a gelling agent; and
   a multifunctional boronic crosslinker comprising a dendritic polymer and two or more boronic functional groups, wherein the dendritic polymer comprises at least one monomer unit selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide alkyl dimethylammoniumethyl methacrylate halide, an alkyl dimethylammoniumpropyl methacrylamide halide, any derivative thereof, and any combination thereof;
   introducing the treatment fluid into a subterranean formation at a pressure sufficient to create or enhance at least one fracture within the subterranean formation.

7. The method of claim 6 wherein the ratio of the boronic functional group to the monomer units in the multifunctional boronic crosslinker is in the range of about 1:1 to about 1:200.

8. The method of claim 6 further comprising contacting the treatment fluid with a breaker; and allowing the viscosity of the fluid to decrease.

9. The method of claim 6 wherein the treatment fluid further comprises a proppant particulate.

10. A treatment fluid, comprising:
an aqueous fluid;
a gelling agent; and
a multifunctional boronic crosslinker comprising a dendritic polymer and two or more boronic functional groups, wherein the dendritic polymer comprises at least one monomer unit selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide alkyl dimethylammoniumethyl methacrylate halide, an alkyl dimethylammoniumpropyl methacrylamide halide, any derivative thereof, and any combination thereof.

11. The treatment fluid of claim 10 wherein the ratio of the boronic functional group to the monomer units in the multifunctional boronic crosslinker is in the range of about 1:1 to about 1:200.

12. The treatment fluid of claim 10 wherein the multifunctional boronic crosslinker is present in the treatment fluid in the range of from about 0.05 pounds per thousand gallons of the treatment fluid to about 85 pounds per thousand gallons of the treatment fluid.

13. The treatment fluid of claim 10 wherein the gelling agent comprises a biopolymer, a synthetic polymer, or a combination thereof.

14. The treatment fluid of claim 10 wherein the gelling agent is present in the treatment fluid in the range of from about 0.1% to about 10% by weight of the aqueous fluid.

* * * * *